United States Patent
Geronimi

(10) Patent No.: US 11,181,325 B2
(45) Date of Patent: Nov. 23, 2021

(54) SYSTEM FOR THE PRODUCTION OF MOLTEN SALT USED AS A HEAT TRANSFER MEDIUM FOR A PYROLYSIS SYSTEM

(71) Applicant: VALGROUP S.A., Luxembourg (LU)

(72) Inventor: Lucas Salim Geronimi, Lorena (BR)

(73) Assignee: VALGROUP S.A., Luxembourg (LU)

( * ) Notice: Subject to any disclaimer, the term of this patent is extended or adjusted under 35 U.S.C. 154(b) by 0 days.

(21) Appl. No.: 17/076,201

(22) Filed: Oct. 21, 2020

(65) Prior Publication Data
US 2021/0187441 A1 Jun. 24, 2021

Related U.S. Application Data

(60) Provisional application No. 62/952,533, filed on Dec. 23, 2019.

(51) Int. Cl.
| | |
|---|---|
| *F28D 20/00* | (2006.01) |
| *C01D 9/02* | (2006.01) |
| *H05B 3/78* | (2006.01) |
| *C09K 5/06* | (2006.01) |
| *C09K 5/02* | (2006.01) |

(Continued)

(52) U.S. Cl.
CPC .............. *F28D 20/00* (2013.01); *B01J 2/00* (2013.01); *C01D 9/02* (2013.01); *C05C 5/00* (2013.01); *C09K 3/18* (2013.01); *C09K 5/00* (2013.01); *C09K 5/02* (2013.01); *C09K 5/06* (2013.01); *C09K 5/063* (2013.01); *C09K 5/12* (2013.01);

(Continued)

(58) Field of Classification Search
None
See application file for complete search history.

(56) References Cited

U.S. PATENT DOCUMENTS

| | | | | |
|---|---|---|---|---|
| 2,870,073 | A | * | 1/1959 | Merlub-Sobel ........... C25C 3/34 205/371 |
| 3,251,754 | A | * | 5/1966 | Calabria ............. B01J 19/0073 205/379 |

(Continued)

OTHER PUBLICATIONS

Belgiorno, V. et al. Energy from gasification of solid wastes. Waste Management, v. 23, n. 1, p. 1-15, 2003. ISSN 0956-053X.

(Continued)

*Primary Examiner* — Thor S Campbell
(74) *Attorney, Agent, or Firm* — Jacob M. Ward; Ward Law Office LLC

(57) ABSTRACT

A system for the production of molten salt. The system can have a preparation tank configured to melt raw salts, and a bubbler system in communication with the preparation tank. The bubbler can be configured to maintain vacuum conditions within the preparation tank and to remove gases from the preparation tank. A method for producing molten salt includes a step of providing a system for the production of molten salt. The system can have a preparation tank configured to melt raw salts, and a bubbler system in communication with the preparation tank. The bubbler can be configured to maintain vacuum conditions within the preparation tank and to remove gases from the preparation tank. Then, the method can include inserting raw salt into the preparation tank, and heating the raw salt to form molten salt. Then filtering the molten salt, and storing the molten salt.

13 Claims, 2 Drawing Sheets

(51) Int. Cl.
*C09K 5/12* (2006.01)
*C05C 5/00* (2006.01)
*B01J 2/00* (2006.01)
*C09K 3/18* (2006.01)
*C09K 5/00* (2006.01)

(52) U.S. Cl.
CPC ....... *H05B 3/78* (2013.01); *F28D 2020/0047* (2013.01)

(56) References Cited

U.S. PATENT DOCUMENTS

| | | | | |
|---|---|---|---|---|
| 4,421,662 | A * | 12/1983 | Fiorucci | C01D 9/16 252/70 |
| 4,609,249 | A * | 9/1986 | Hornack | C25C 3/16 204/288.2 |
| 4,620,905 | A * | 11/1986 | Tarcy | C25C 7/025 204/247.4 |
| 4,724,121 | A * | 2/1988 | Weyand | B01D 1/18 204/291 |
| 5,017,135 | A * | 5/1991 | Meyer | A61C 17/065 433/92 |
| 5,032,260 | A * | 7/1991 | Alzner | A61C 17/065 210/137 |
| 5,078,573 | A * | 1/1992 | Peroaho | F04C 19/00 415/143 |
| 5,338,115 | A * | 8/1994 | Gregg | B01F 7/247 366/263 |
| 5,426,976 | A * | 6/1995 | McHardy | G01F 23/165 73/202 |
| 5,500,238 | A * | 3/1996 | Thienpont | A23B 4/0053 426/511 |
| 5,772,041 | A * | 6/1998 | Kertscher | B29B 13/022 209/11 |
| 5,984,987 | A * | 11/1999 | Kohl | C10J 3/57 48/209 |
| 6,767,665 | B1 | 7/2004 | Ohrem et al. | |
| 6,824,702 | B1 * | 11/2004 | Ohrem | H01M 6/20 252/68 |
| 7,588,694 | B1 | 9/2009 | Bradshaw et al. | |
| 7,703,304 | B2 | 4/2010 | Jeong et al. | |
| 7,922,931 | B1 | 4/2011 | Cordaro et al. | |
| 8,697,133 | B2 * | 4/2014 | Moore | A61K 9/145 424/490 |
| 9,567,232 | B1 * | 2/2017 | Stella | C01F 7/002 |
| 9,932,509 | B2 | 4/2018 | Obrestad et al. | |
| 9,976,198 | B2 * | 5/2018 | Atul | B23K 3/08 |
| 10,814,525 | B1 | 10/2020 | Geronimi | |
| 2003/0047463 | A1 * | 3/2003 | Ward-Close | C22B 34/129 205/538 |
| 2004/0011660 | A1 * | 1/2004 | Bradford | C25C 3/06 205/385 |
| 2006/0130610 | A1 * | 6/2006 | Ward-Close | C22B 34/1295 75/345 |
| 2010/0202954 | A1 * | 8/2010 | Yamada | C01B 33/037 423/349 |
| 2015/0078504 | A1 * | 3/2015 | Woolley | G21D 1/00 376/100 |
| 2015/0368534 | A1 * | 12/2015 | Zeng | C09K 5/00 252/71 |
| 2016/0217874 | A1 * | 7/2016 | Dewan | G21C 3/54 |
| 2017/0067667 | A1 * | 3/2017 | Choi | F24S 80/20 |
| 2017/0241649 | A1 * | 8/2017 | Cave | F28D 20/0056 |
| 2020/0211724 | A1 * | 7/2020 | Cisneros, Jr. | G21C 19/50 |
| 2020/0232106 | A1 * | 7/2020 | Rappleye | F27D 99/0006 |

OTHER PUBLICATIONS

Santaweesuk, C. et al. The Production of Fuel Oil by Conventional Slow Pyrolysis Using Plastic Waste from Municipal Landfill. International Journal of Environmental Science and Development, vol. 8, No. 3, Mar. 2017.

Kharat S. et al. A Review on Plastic Pyrolysis Process. International Journal of Innovative Research in Science, Engineering and Technology, vol. 7, Issue 3, Mar. 2018.

Sharuddin S. et al. Energy Recovery from Pyrolysis of Plastic Waste: Study on non—recycled plastics (NRP) data as the real measure of plastic waste. Energy Conversion and Management 148, 2017.

Sharobem T. Tertiary Recycling of Waste Plastic: An Assessment of Pyrolysis by Microwave Radiation. Department of Earth and Environmental Engineering Fu Foundation of Engineering and Applied Science. Columbia University, Can 2010.

Huang Y. et al. A Review on Microwave Pyrolysis of Lignocellulosic Biomass. Sustainable Environment Research 26, 2016.

Nakanoh K. et al. Waste Treatment Using Induction-Heated Pyrolysis. Fuji Electric Review, vol. 47, No. 3.

Villada C. et al. Thermal Evolution of Molten Salts for Thermal Energy Storage. Renewable Energies and Power Quality, No. 12, Apr. 2014.

Bauer T. et al. Overview of Molten Salt Storage Systems and Material Development for Solar Thermal Power Plants.

Gordon et al. Differential Thermal Analysis of Inorganic Compounds Nitrates and Perchlorates of the Alkali and Alkaline Earth Groups and Their Subgroups. Analytical Chemistry, v.27, n.7, p. 1102-1109, 1995.

* cited by examiner

SYSTEM FOR THE PRODUCTION OF MOLTEN SALT USED AS A HEAT TRANSFER MEDIUM FOR A PYROLYSIS SYSTEM

CROSS REFERENCE TO RELATED APPLICATIONS

This application claims the benefit of U.S. Provisional Application Ser. No. 62/952,533, filed on Dec. 23, 2019. The entire disclosure of the above application is hereby incorporated herein by reference.

FIELD

The present disclosure relates generally to the production of a molten salt to be used as a heat transfer medium for a thermochemical treatment process.

BACKGROUND

This section provides background information related to the present disclosure which is not necessarily prior art.

Thermochemical treatment generally includes the transformation of the chemical structure of a raw material under high temperature. The three main thermochemical treatment processes are combustion, gasification, and pyrolysis. Each of these treatment processes includes different operations and consequently generates different products. Examples of these three main thermochemical treatment processes are disclosed in BELGIORNO, V. et al. Energy from gasification of solid wastes. Waste Management, v. 23, n. 1, p. 1-15, 2003. ISSN 0956-053X.

As a non-limiting example, pyrolysis is a process that requires a high temperature to occur. Usually, the temperature required for the pyrolysis process is around 400° C.-500° C. To achieve this temperature, some common heat processes are usually employed. Such processes can include: a direct or indirect flame burner using liquefied petroleum gas (LPG) or Syngas (e.g., SANTAWEESUK, C. and JAN-YALERTADUN A. The Production of Fuel Oil by Conventional Slow Pyrolysis Using Plastic Waste from Municipal Landfill. International Journal of Environmental Science and Development, Vol. 8, No. 3, March 2017; KHARAT S. and KARWANDE R. A Review on Plastic Pyrolysis Process. International Journal of Innovative Research in Science, Engineering and Technology, Vol. 7, Issue 3, March 2018. SHARUDDIN S. et al. Energy Recovery from Pyrolysis of Plastic Waste: Study on non-recycled plastics (NRP) data as the real measure of plastic waste. Energy Conversion and Management 148, 2017); microwave radiation (e.g., SHAROBEM T. Tertiary Recycling of Waste Plastic: An Assessment of Pyrolysis by Microwave Radiation. Department of Earth and Environmental Engineering Fu Foundation of Engineering and Applied Science. Columbia University, Can 2010; Huang Y. et al. A Review on Microwave Pyrolysis of Lignocellulosic Biomass. Sustainable Environment Research 26, 2016); and induction (e.g., NAKANOH K. et al. Waste Treatment Using Induction-Heated Pyrolysis. Fuji Electric Review, Vol. 47, No 3).

These common heat processes present certain benefits as well as limitations. In the direct burner process, the material achieves the required temperature in a reasonable amount of time. However, this process cannot be easily controlled. The lack of control can result in an explosion if gases generated during the process contact the burner flame or if oxygen contacts the material inside the process vessel. Microwave technology has advantages over conventional heat sources. Microwave technology is able to transfer energy from inside a material to outside the material. This allows better temperature control of the system. However, there are few studies considering the cost and influence of this technology in the final products. Induction technology can present a low possibility of dioxin generation, a rapid heating rate, easy temperature control, high energy efficiency, and low-cost equipment.

Many technologies related to heat transfer have been researched in order to facilitate the heating process. These new technologies face the disadvantages presented by the common technologies. One of the technologies that have been researched is the use of nitrate-based salts. These salts are also known as molten salts, which could be used as thermal energy storage (TES) or as a heat transfer fluid (HTF). Usually, at high temperature these salts present good thermal stability, high heat capacity, low vapor pressure, and low corrosivity.

The mostly common molten salt used is the binary salt, composed of 60% $NaNO_3$ and 40% $KNO_3$, which is known as Solar Salt and has a melting point of 222° C. This mixture of salts has a higher melting point, which is a disadvantage for the process. Other combinations of nitrate salts have therefore been tested in order to achieve a lower melting point temperature.

The use of ternary nitrate salts is also known. For example, sodium (Na), calcium (Ca), and potassium (K) nitrates are used as heat transfer fluids and for thermal storage in solar thermal plants. Ternary salts have advantages of a lower freezing points, better thermal stabilities, and higher work temperatures. However, the quantity of calcium nitrate should be carefully controlled, because it is fundamental for good stability of the salt. The use of a high quantity of calcium nitrate can cause the formation of a solid fraction in the salt, which could cause interruption of the process.

There are also descriptions about the use of lithium (Li) nitrate instead of calcium (Ca) nitrate, as disclosed by VILLADA C. et al. Thermal Evolution of Molten Salts for Thermal Energy Storage. Renewable Energies and Power Quality, No 12, April 2014. BAUER T. and BREDEIN-BACH N. Overview of Molten Salt Storage Systems and Material Development for Solar Thermal Power Plants. This combination also presented good thermal stability and a low melting point temperature.

Such nitrate salts are usually melted inside the tank where they will be used and the heating process usually occurs using a gas generator, with gas as the heating medium. However, the use of a gas as the heating element does not allow control of the process. Since the nitrate salts usually have a high-water content, during the melt phase some bubbles can be observed and control of these bubbles can be accomplished through the temperature control. Thus, the use of this technology for heating the salt is not ideal because it does not allow an efficient temperature control.

There is a continuing need for an efficient system and method for production of molten salt, where the molten salt is applied as a heat transfer medium.

SUMMARY

In concordance with the instant disclosure, for an efficient system and method for production of molten salt, which can be applied as a heat transfer medium, has been surprisingly discovered.

In particular, the present disclosure includes the description of the procedure and equipment for the processing of molten salt to be applied as a heat transfer fluid for thermochemical processes.

As disclosed by GORDON and CAMPBELL. Differential Thermal Analysis of Inorganic Compounds Nitrates and Perchlorates of the Alkali and Alkaline Earth Groups and Their Subgroups. Analytical Chemistry, v. 27, n. 7, p. 1102-1109, 1995, when alkali metal nitrates are melted, a series of steps occurs, which include: crystalline transformation, dehydration, melting, bubbling, and decomposition. During the dehydration step, which takes place at approximately 120° C., the water inside the salt crystalline structure evaporates and can generate bubbles in the process.

In one embodiment, a system for the production of molten salt can have a preparation tank configured to melt raw salts and a bubbler system in communication with the preparation tank. The bubbler can be configured to maintain vacuum conditions within the preparation tank and to remove gases from the preparation tank.

In another embodiment, a method for producing molten salt includes a step of providing a system for the production of molten salt. The system can have a preparation tank configured to melt raw salts and a bubbler system in communication with the preparation tank. The bubbler can be configured to maintain vacuum conditions within the preparation tank and to remove gases from the preparation tank. The method can include inserting raw salt into the preparation tank and heating the raw salt to form molten salt. The molten salt can then be filtered and can also be stored.

DRAWINGS

The drawings described herein are for illustrative purposes only of selected embodiments and not all possible implementations, and are not intended to limit the scope of the present disclosure.

DETAILED DESCRIPTION

Figure 1:
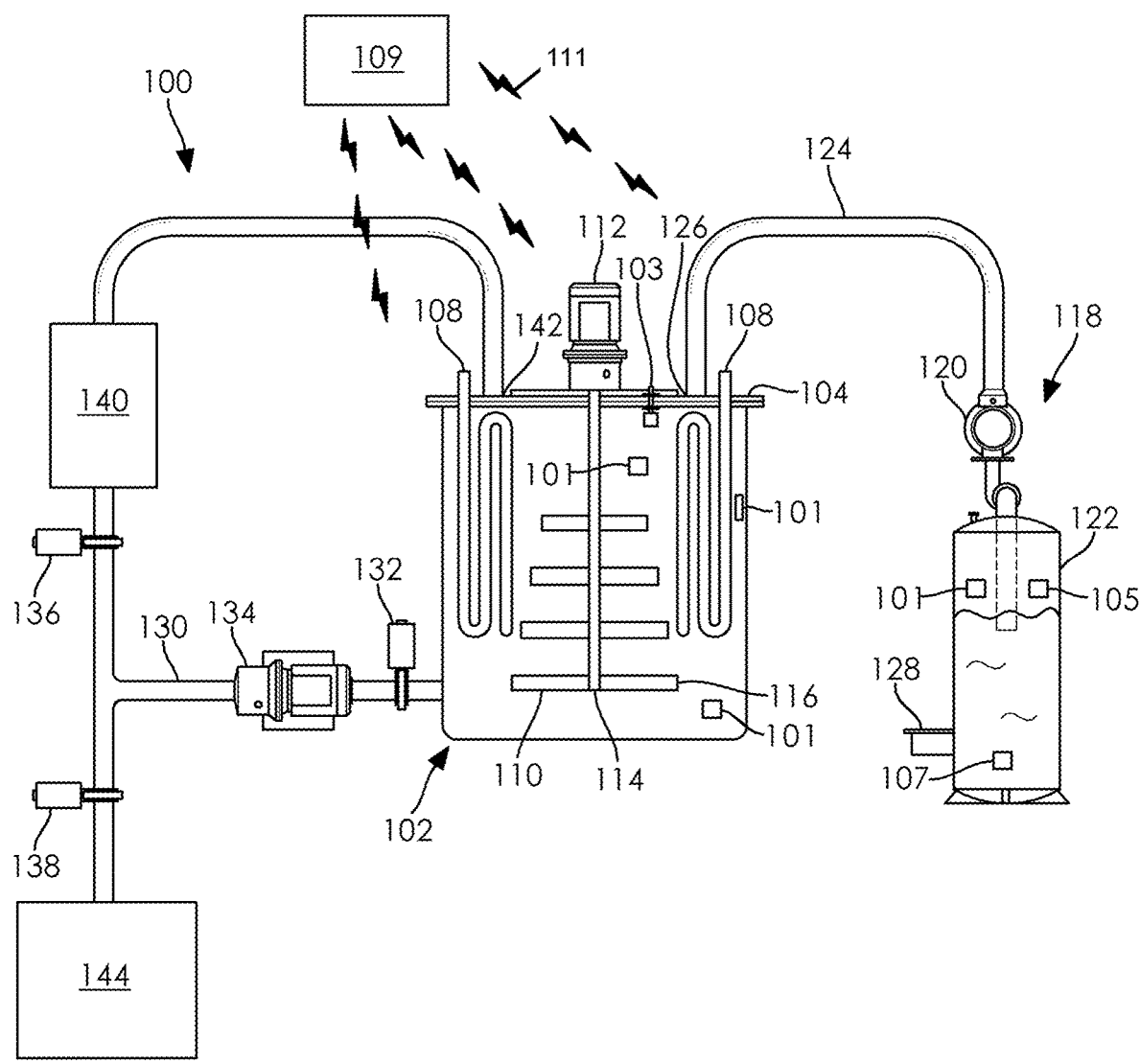
FIG. 1 is a schematic view of a system for production of molten salt, according to one embodiment of the present disclosure.

The following description of technology is merely exemplary in nature of the subject matter, manufacture and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

With reference to FIG. 1, a system for production of molten salt 100 is shown. The system 100 for production of molten salt can be configured to produce molten salt for a variety of end uses. Desirably, the system 100 can be configured to product molten salt with good thermal stability, high heat capacity, low vapor pressure, and low corrosivity, at a relatively high temperature. The molten salt can include one or more of $NaNO_3$, $KNO_3$, $LiNO_3$, $Ca(NO_3)_2$, as non-limiting examples. A skilled artisan can select other suitable salts for the molten salt, as desired.

As one non-limiting example, the system 100 for production of molten salt can be configured to produce molten salt to be used as a heat transfer medium for plastic waste treatment. One such system is a Continuous Liquefaction and Filtration System for Waste Plastic Treatment as described in the co-owned U.S. patent application Ser. No.

16/779,753 to Geronimi, the entire disclosure of which is incorporated herein by reference. The continuous liquefaction and filtration system can include a first device, which may be configured to melt and filter solid waste plastic material, and a second device, which may be in communication with the first device and also configured to melt solid waste plastic material. The system 100 can be configured to provide the molten salt to be used as a heating element in each of the first device and the second device.

Figure 3:
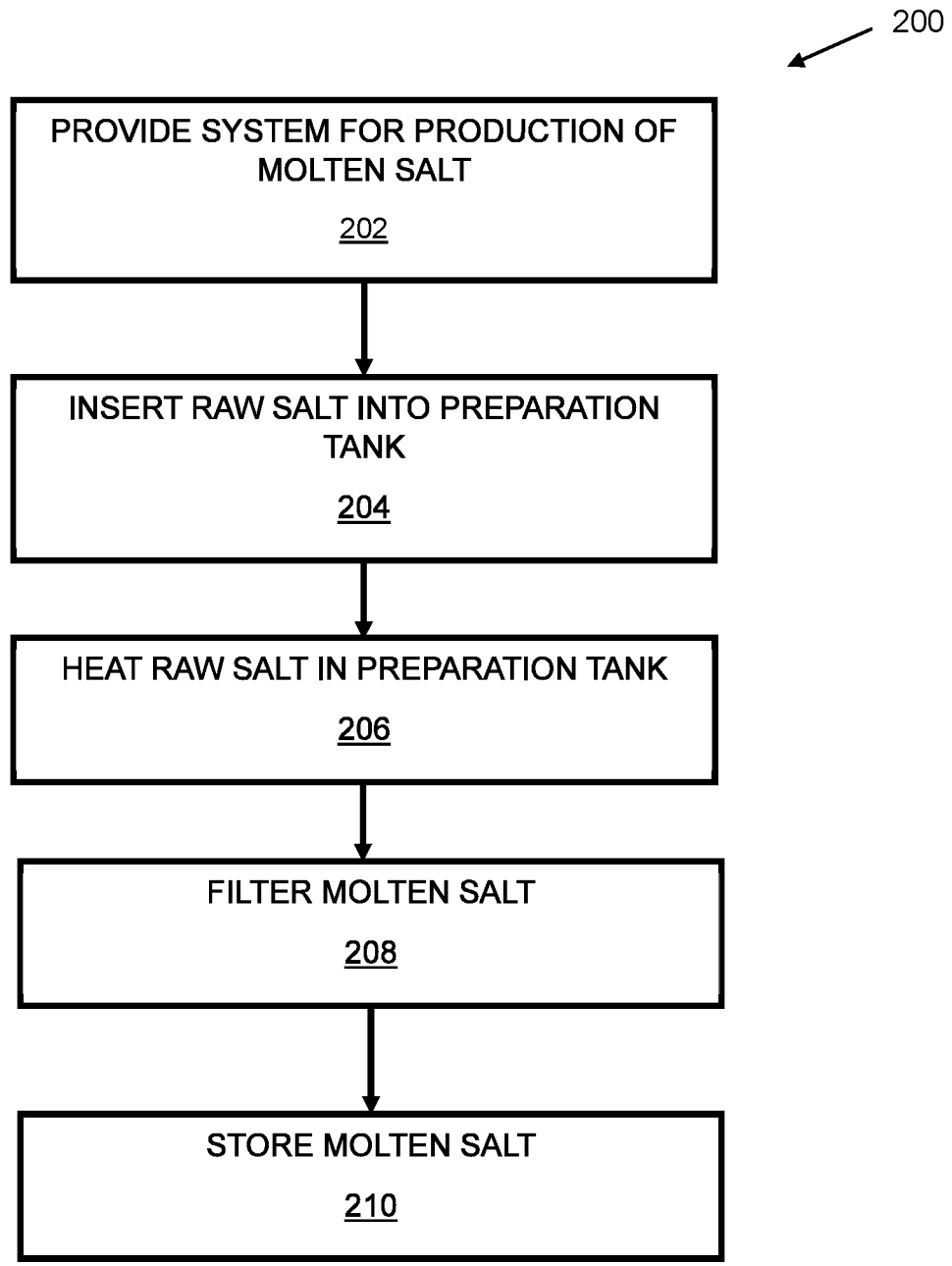
FIG. 3 is a flow chart illustrating a method of producing molten salt, according to a further embodiment of the present disclosure.

The system 100 for production of molten salt can be in communication with a control unit 109. The control unit 109 can be configured to send and receive wireless signals 111 from the system 100, as described in greater detail hereinbelow. The control unit 109 can include a computer having a processor and a memory with non-transitory processor-executable instructions tangibly embodied thereon. The control unit 109 can further have a human interface such as a touchscreen or manual controls that permits an operator to operate the system 100 for production of molten salt. In particular, the control unit 109 can be configured to execute a method 200 of the present disclosure, for example, as shown in FIG. 3, and described hereinbelow. One skilled in the art can select other suitable types of control unit 109s within the scope of the present disclosure. It should be appreciated that the control unit 109 can be configured to monitor the system 100 for production of molten salt, such that the control unit 109 can be configured to send and receive signals at pre-determined locations throughout the system 100. The control unit 109 can receive signals from various temperature sensors 101, level sensors 103, pressure sensors 105, and pH sensors 107, described in greater detail hereinbelow. When the control system receives a signal from one of the sensors 101, 103, 105, 107, the system 100 for production of molten salt can be configured automatically respond to the signal, as described in greater detail hereinbelow.

With continued reference to FIG. 1, the system 100 for production of molten salt can include a preparation tank 102. The preparation tank 102 can be configured to receive raw solid salt, in operation. The preparation tank 102 can be substantially cylindrical. The preparation tank 102 can have a bottom edge that is rounded or contoured. Advantageously, the cylindrical shape and the contoured bottom edge can improve a stirring of the molten salt, in operation, and as described in greater detail hereinbelow.

Figure 2:
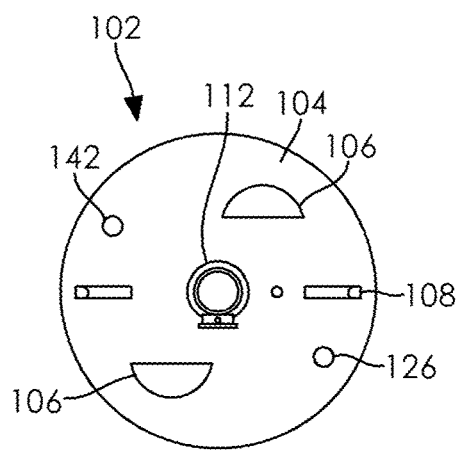
FIG. 2 is a top plan view of a preparation tank of the system for production of molten salt shown in FIG. 1.

The preparation tank 102 can have a top or a lid 104. The lid 104 can be disposed on a top edge of the preparation tank 102. As shown in FIG. 2, the lid 104 can have a raw salt entrance 106 formed therethrough. In particular embodiments, the raw salt entrance 106 can be a plurality of raw salt entrances 106, most particularly, two raw salt entrances 106. The raw salt entrance 106 can be configured to receive the solid raw salt and direct the raw salt to an interior of the preparation tank 102.

The preparation tank 102 can include a heating element 108. The heating element 108 can be configured to melt and dehydrate the raw salt. In particular examples, the preparation tank 102 can have a plurality of heating elements 108, and most particularly, the preparation tank 102 can have two heating elements 108. As a non-limiting example, the heating element 108 can be a resistor that provides heat through an electric current. As another non-limiting example, the heating element 108 can be a coiled tube. A skilled artisan can select other suitable heating elements 108 for the system for production of molten salt 100, as desired.

The preparation tank 102 can also include a mechanical stirrer 110. The mechanical stirrer 110 can be powered by a motor 112. The motor 112 can be disposed on the lid 104 of the preparation tank 102. The mechanical stirrer 110 can include an arm 114 with a plurality of panels 116 disposed thereon. The mechanical stirrer 110 can be configured to physically displace the salt when disposed in the interior of the preparation tank 102. Advantageously, the mechanical stirrer 110 can improve the efficiency of the melting and dehydrating of the salt by allowing for a more even heating by the heating element 108. A skilled artisan can select other suitable methods for stirring the salt, in operation.

The preparation tank 102 can have a temperature sensor 101 disposed therein. The temperature sensor 101 can be configured to monitor a temperature of the salt within the preparation tank 102. In particular examples, the preparation tank 102 can have a plurality of temperature sensors 101 disposed therein. The temperature sensors 101 can be disposed along a length of the preparation tank 102. Likewise, the temperature sensors 101 can be disposed along a width of the preparation tank 102.

It should be appreciated that the salts have a critical work temperature. The critical work temperature is a temperature at which is the salts can start to undesirably decompose. The temperature sensors 101 can monitor the salt within the preparation tank 102. When the temperature sensors 101 determine the salt is approaching the critical work temperature, a signal can be sent to the control unit 109, which can automatically adjust a temperature of the heating elements 108. For example, where the heating element 108 is a resistor, the control unit 109 can reduce the electric current through the resistor thereby reducing the temperature of the heating element 108. Advantageously, the temperature sensors 101 and the control unit 109 can militate against an undesirable degradation of the salt within the system 100 for production of molten salt.

The preparation tank 102 can include a level sensor 103. The level sensor 103 can be configured to monitor for bubbles that can be formed, in operation, within the preparation tank 102. When a predetermined amount of bubbles is detected by the level sensor 103, the level sensor 103 can send a signal to the control unit 109. The control unit 109 can be configured to lower the temperature of the heating elements 108 to reduce the level of bubbles within the preparation tank 102, in operation.

The system 100 for production of molten salt can have a bubbler system 118. The bubbler system 118 can include a vacuum pump 120 and a bubbler 122. The vacuum pump 120 can be in fluid communication with each of the preparation tank 102 and the bubbler 122. The vacuum pump 120 can be a water ring vacuum pump. The vacuum pump 120 can be configured to maintain vacuum conditions within the system for production of molten salt 100.

In particular, the vacuum pump 120 can be connected via a pipe 124 to a gas aperture 126 formed in the top 104 of the preparation tank 102. In operation, when gas is formed in the preparation tank 102, for example, from formation of water vapor from melted salt crystals or from various impurities, the vacuum pump 120 can remove this gas. The vacuum pump 120 can be configured to pump the gas from the preparation tank 102 via the gas aperture 126, through the pipe 124, and to the vacuum pump 120. The vacuum pump 120 can be configured to mix the collected gases with water, and pump the dissolved solution to the bubbler 122.

The bubbler 122 can be configured to treat the dissolved gases from the vacuum pump 120. The bubbler 122 can include one of the temperature sensors 101, one of the pressure sensors 105, and one of the pH sensors 107. The sensors 101, 105, and 107 of the bubbler 122 can be configured to monitor the conditions of the bubbler 122. Advantageously, the sensors 101, 105, and 107 of the bubbler 122 can send signals to the control unit 109, which can adjust the conditions inside the bubbler 122, to increase the efficacy of the bubbler 122, as needed.

The bubbler 122 can also include a neutralizing system 128. The neutralizing system 128 can be in communication with the pH sensor 107. In operation, the pH sensor monitors the solution within the bubbler 122. When the pH sensor reads a pH below a predetermined pH value, the pH sensor can send a signal to the control unit 109. The control unit 109 can actuate the neutralizing system 128. The neutralizing system 128 can introduce a neutralizing solution to the bubbler 122, thereby, increasing the pH of the solution within the bubbler 122 to a pH value above the predetermined value.

With continued reference to FIG. 1, the preparation tank 102 can have an exit pipe 130, which can be configured to remove and direct the molten salt selectively exiting the preparation tank 102. The exit pipe 130 can be disposed near a bottom of the preparation tank 102. The exit pipe 130 can have a first valve 132. When the first valve 132 is opened, the molten salt can flow into the exit pipe 130. A pump 134 can be disposed on the exit pipe 130 after the first valve 132. When the first valve 132 is opened, the molten salt can be pumped through the exit pipe 130 from the preparation tank 102.

A second valve 136 and a third valve 138 can each be disposed between the pump 134 and a filter 140. When the second valve 136 is opened, the molten salt can be pumped through the filter 140. The filter 140 can remove any residual solids or impurities from the molten salt. The filtered salt can be pumped from the filter 140 to the preparation tank 102 via a filtered salt opening 142 on the top 104 of the preparation tank 102. When the third valve 138 is opened, the molten salt can be pumped to a storage container 144. The storage container 144 can be heated. A heated container can be configured to maintain the salt in the liquid phase. The storage container 144 can be at room temperature. A room temperature container can be configured to solidify the salt, which will need to be heated before another use. A skilled artisan may select other suitable storage containers 144, as desired.

The present disclosure further contemplates a method 200 for producing molten salt, for example, as shown in FIG. 2. A first step 202 in the method 200 can include providing the system for production of molten salt 100, as described hereinabove.

A second step 204 in the method 200 can be inserting the raw salt into the system 100. In particular, the salt can be disposed through the molten salt entrance 106 of the top 104 of the preparation tank 102. As described hereinabove, the salt can include $NaNO_3$, $KNO_3$, $LiNO_3$, $Ca(NO_3)_2$, and combinations thereof, as non-limiting examples.

The method 200 can have a third step 206 of heating the salt within the preparation tank 102. In particular, the control unit 109 can power the heating elements 108 by increasing a flow of electricity through the resistor, as a non-limiting example. The mechanical stirrer 110 can continually stir the salt throughout the heating step 206. The salt can be heated in the preparation tank 102 through the dehydrating and the melting of the salt.

The bubbler system 118 can be used throughout the dehydrating and the melting of the salt to remove any gases that form within the preparation tank 102 and to maintain vacuum conditions. The gases can be pumped from the preparation tank via the vacuum pump 120, mixed with water, and pumped to the bubbler 122 for treatment.

The level sensor 103 can continually monitor the preparation tank 102 through the dehydrating and the melting of the salt. If the predetermined amount of bubbles is detected by the level sensor 103, the control unit 109 can reduce the heat provided by the heating elements to decrease the amount of bubbles in the preparation tank 102.

A fourth step 208 in the method 200 can be filtering the molten salt. In particular, the control unit 109 can open the first valve 132. The pump 134 can pump the molten salt into the exit pipe 130. The control unit 109 can open the second valve 136 and pump the molten salt to the filter 140. The filter can remove any residual solids from the molten salt. The filtered molten salt can then be pumped into the preparation tank 102 via the filtered salt opening 142 in the top 104 of the preparation tank 102. The filtering step 208 can occur multiple times throughout the method 200 until a desired consistency of the molten salt is reached, which can improve the efficiency of the system 100.

A fifth step 210 in the method can be storing the molten salt. In particular. The second valve 136 can be closed, and the third valve 138 can be opened. The pump 134 can then pump the molten salt from the preparation tank 102 to the storage container 144. The salt can be stored in the storage container 144 until required for the end use as a heat exchanger.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A system for molten salt production, comprising:
   a preparation tank configured to melt a raw salt to form a molten salt; and
   a bubbler system in fluid communication with the preparation tank, the bubbler system configured to maintain a vacuum condition within the preparation tank and to remove gas from the preparation tank;
   wherein the system is further configured according to a member selected from a group consisting of:
   (a) the bubbler system includes a ring water vacuum pump and a bubbler, the ring water vacuum pump configured to pump gas from the preparation tank, to mix the gas with water to form a solution, and to pump the solution to the bubbler;
   (b) the bubbler system includes a vacuum pump and a bubbler, the bubbler including a pressure sensor, a temperature sensor, a pH sensor, and a neutralization system in communication with the pH sensor; and
   (c) the preparation tank includes a pressure sensor, a temperature sensor, and a level sensor, the level sensor configured to monitor for a predetermined level of bubbles in the preparation tank.

2. The system for molten salt production of claim 1, wherein the preparation tank includes a heating element disposed therein.

3. The system for molten salt production of claim 2, wherein the heating element includes a resistor.

4. The system for molten salt production of claim 1, wherein the preparation tank includes a mechanical stirrer.

5. The system for molten salt production of claim 1, further comprising a filter in fluid communication with the preparation tank and configured to filter the molten salt.

6. The system for molten salt production of claim 5, further comprising a pump in fluid communication with the filter and the preparation tank and configured to transport the molten salt from the preparation tank to the filter.

7. The system for molten salt production of claim 1, further comprising a storage container in fluid communication with the preparation tank.

8. The system for molten salt production of claim 1, further comprising a control unit in communication with a plurality of sensors disposed within the system, the control unit configured to monitor the plurality of sensors.

9. A continuous liquefaction and filtration system for treatment of plastic waste, comprising:
 a first device configured to melt and filter solid waste plastic material; and
 a system for production of molten salt in fluid communication with the first device, the system having a preparation tank configured to melt a raw salt to form a molten salt, and a bubbler system in fluid communication with the preparation tank, the bubbler system configured to maintain a vacuum condition within the preparation tank and to remove gas from the preparation tank, wherein the system is further configured according to a member selected from a group consisting of:
 (a) the bubbler system includes a ring water vacuum pump and a bubbler, the ring water vacuum pump configured to pump gas from the preparation tank, to mix the gas with water to form a solution, and to pump the solution to the bubbler;
 (b) the bubbler system includes a vacuum pump and a bubbler, the bubbler including a pressure sensor, a temperature sensor, a pH sensor, and a neutralization system in communication with the pH sensor; and
 (c) the preparation tank includes a pressure sensor, a temperature sensor, and a level sensor, the level sensor configured to monitor for a predetermined level of bubbles in the preparation tank.

10. A method for producing molten salt, comprising:
 providing a system having a preparation tank configured to melt a raw salt to form a molten salt, and a bubbler system in fluid communication with the preparation tank, the bubbler system configured to maintain a vacuum condition within the preparation tank and to remove gas from the preparation tank, wherein the system is further configured according to a member selected from a group consisting of:
 (a) the bubbler system includes a ring water vacuum pump and a bubbler, the ring water vacuum pump configured to pump gas from the preparation tank, to mix the gas with water to form a solution, and to pump the solution to the bubbler;
 (b) the bubbler system includes a vacuum pump and a bubbler, the bubbler including a pressure sensor, a temperature sensor, a pH sensor, and a neutralization system in communication with the pH sensor; and
 (c) the preparation tank includes a pressure sensor, a temperature sensor, and a level sensor, the level sensor configured to monitor for a predetermined level of bubbles in the preparation tank;
 inserting the raw salt into the preparation tank;
 heating the raw salt to form the molten salt;
 filtering the molten salt; and
 storing the molten salt.

11. The method of claim 10, wherein the step of filtering the molten salt is repeated until a desired consistency of the molten salt is reached.

12. The method of claim 10, wherein the system further includes a control unit and a plurality of sensors configured to monitor the system.

13. The method of claim 10, wherein the raw salt includes a member selected from a group consisting of $NaNO_3$, $KNO_3$, $LiNO_3$, $Ca(NO_3)_2$, and combinations thereof.

* * * * *